(12) United States Patent
Kuroiwa

(10) Patent No.: US 7,339,576 B2
(45) Date of Patent: Mar. 4, 2008

(54) INFORMATION DISPLAY DEVICE AND INFORMATION SELECTING AND DISPLAYING METHOD

(75) Inventor: Takeshi Kuroiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 10/800,105

(22) Filed: Mar. 12, 2004

(65) Prior Publication Data

US 2004/0227745 A1   Nov. 18, 2004

(30) Foreign Application Priority Data

Mar. 14, 2003   (JP) ............................. 2003-070730

(51) Int. Cl.
  *G09G 5/00*  (2006.01)
  *G06F 3/02*  (2006.01)
  *G06F 1/16*  (2006.01)

(52) U.S. Cl. ...................... 345/169; 345/156; 345/902; 361/684

(58) Field of Classification Search ................ 345/156, 345/169
See application file for complete search history.

(56) References Cited

U.S. PATENT DOCUMENTS

| | | | |
|---|---|---|---|
| 6,275,376 B1 * | 8/2001 | Moon ........................ | 361/683 |
| 6,658,272 B1 * | 12/2003 | Lenchik et al. .......... | 455/575.1 |
| 6,747,635 B2 * | 6/2004 | Ossia ......................... | 345/169 |
| 6,750,886 B1 * | 6/2004 | Bergstedt ................... | 715/784 |
| 6,862,604 B1 * | 3/2005 | Spencer et al. ............ | 707/205 |
| 7,002,604 B1 * | 2/2006 | Barrus et al. .............. | 345/649 |

* cited by examiner

*Primary Examiner*—Richard Hjerpe
*Assistant Examiner*—My-Chau T. Tran
(74) *Attorney, Agent, or Firm*—Oblon, Spivak, McClelleand, Maier & Neustadt, P.C.

(57) ABSTRACT

An information display device includes a main unit that houses a removable semiconductor memory and a display unit that has approximately the same shape as that of the main unit and that displays information read from the semiconductor memory. The main unit and the display unit are interconnected by a connecting portion having a rotating shaft around which the display unit is rotated relative to the main unit on an opposing plane between a main-unit top face and a display-unit principal face, which oppose each other. The main unit includes a semiconductor memory insertion slot in which the semiconductor memory is inserted. The semiconductor memory insertion slot is disposed at an end of the main unit, differing from that at which the connecting portion is disposed.

17 Claims, 5 Drawing Sheets

FIG. 4A
FIG. 4B
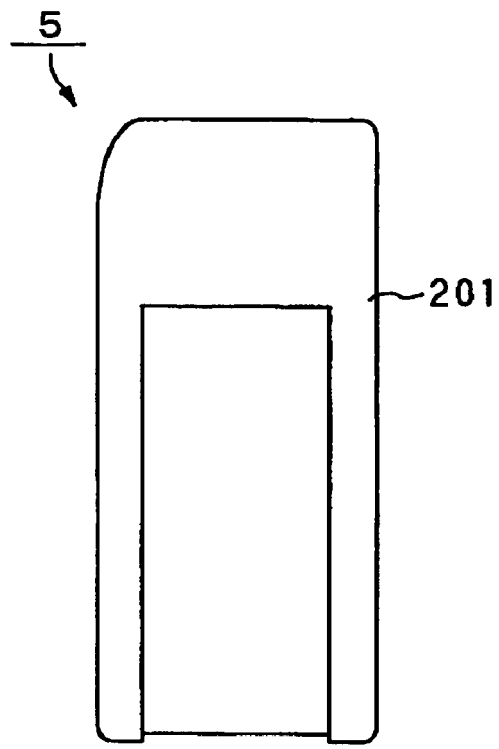
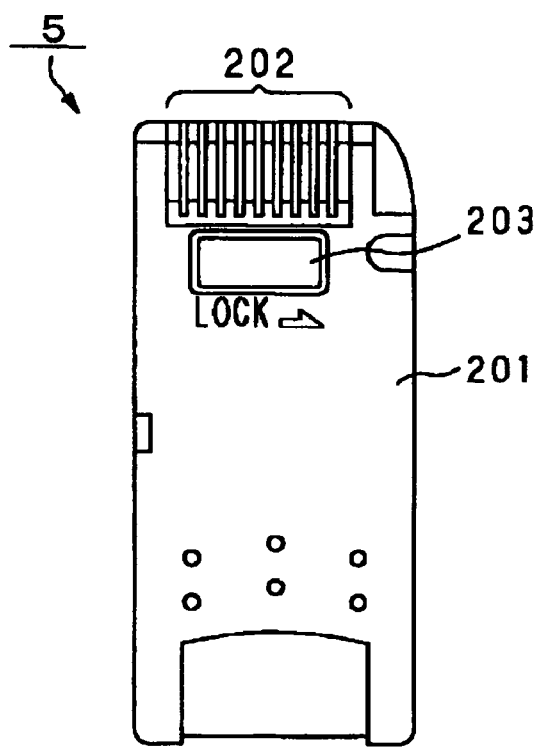
FIG. 5
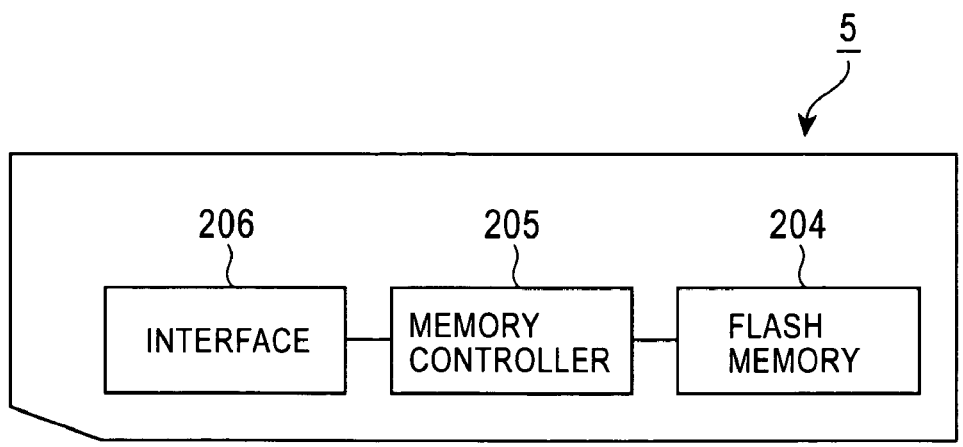

INFORMATION DISPLAY DEVICE AND INFORMATION SELECTING AND DISPLAYING METHOD

BACKGROUND OF THE INVENTION

1. Field of the Invention

The present invention relates to information display devices and information selecting and displaying methods, and more particularly relates to an information display device for displaying information selected from information managed by an information processing terminal and extracted into a semiconductor memory and an information selecting and displaying method for selecting and displaying such information.

2. Description of the Related Art

As portable information processing terminals including personal digital assistants (PDAs) have become widely used and cellular phones have become more sophisticated, users can easily possess a large amount of information. Since information apparatuses such as portable information processing terminals and cellular phones have a function of connecting to the so-called Internet, an information communication environment has been constructed in which information that used to be available only by personal computers (PC) (many of which are stationary) that can connect to the Internet is now available in a simple manner at any time.

In addition to the above PDAs and cellular phones, compact, large-capacity semiconductor memories have become widely used. Such semiconductor memories can be inserted into, in addition to the above information apparatuses, an increasing number of various electronic apparatuses such as PCs, video cassette recorders, and digital still cameras for recording and playing information. The semiconductor memories can record data simultaneously in plural formats, such as still image data, moving image data, and audio data (music data). With such a recording medium, a user need not use recording media associated with individual electronic apparatuses handling data in different formats. The user may use a single recording medium in these electronic apparatuses. Recently, semiconductor memories have become capable of storing a larger amount of data. Semiconductor memories of 4 MB to 1 GB have been commercially available. Large-capacity semiconductor memories exceeding 1 GB have been developed.

The functionality of the information apparatuses is enhanced in combination with the semiconductor memories. A large amount of data may be exchanged between the information apparatuses via a semiconductor memory even when the information apparatuses have no dedicated interfaces.

Of numerous functions of the information apparatuses, the functions actually needed by users include quickly checking the schedule or up-to-date information and, where necessary, quickly searching for the email address and/or phone number of a person who has sent an email message or has called.

Although the functions and performance of the PDAs and the cellular phones have become more sophisticated, there are cases where a user cannot reach desired information unless the user follows the same procedure as when using a PC, such as booting the machine, starting up the software, and so forth. In terms of efficiency in viewing necessary information, the PDAs and the cellular phones are inconvenient when the user need information as quickly as possible. In terms of user-friendliness of these information processing terminals, the user wanting to view information may not be able to operate the information processing terminal on a crowded train or when only one hand of the user is free.

SUMMARY OF THE INVENTION

Accordingly, it is an object of the present invention to provide an information display device that efficiently carries the minimum information required and that enables quick viewing of information and an information selecting and displaying method for selecting and obtaining information from a site and efficiently displaying the obtained information.

In order to achieve the foregoing objects, an information display device according to an aspect of the present invention includes a planar main unit including a semiconductor memory insertion slot in which a thin planar semiconductor memory is removably stored; a planar display unit having substantially the same shape as the planar main unit, the planar display unit including display means for displaying content recorded on the semiconductor memory; an operation unit for entering an operation instruction to change the display state of the content on the display means; and a controller changing the display state of the content on the display means, the content being stored on the semiconductor memory, in accordance with the operation instruction entered using the operation unit, and displaying the content. The planar main unit and the planar display unit are interconnected by a connecting portion having a rotating shaft around which a planar-main-unit top face and a planar-display-unit principal face are rotated on an opposing plane between the planar-main-unit top face and the planar-display-unit principal face, which oppose each other.

The controller may change the direction of the content being displayed on the display means in accordance with the angle of rotation of the planar display unit relative to the planar main unit. The content may include information managed by predetermined software on an information processing terminal to which the semiconductor memory is connectable. Alternatively, the content may be content that is obtained via a network by an information processing terminal to which the semiconductor memory is connectable, selected by the information processing terminal, and stored on the semiconductor memory. The content may be obtained at a specified time, from a specified uniform resource locator (URL), both of which are specified by the information processing terminal.

The content may particularly be text content.

In order to achieve the foregoing objects, an information selecting and displaying method according to another aspect of the present invention is a method for selecting information by an information processing terminal to which a semiconductor memory is connectable, extracting the information, and displaying the information by an information display device. The information selecting and displaying method includes a content selecting step of selecting at least part of content by the information processing terminal; a content extracting step of extracting the selected content in a format that can be viewed on the information display device; and a display step of displaying, by the information display device, the content extracted into the semiconductor memory in the content extracting step.

The content selected in the content selecting step may include information managed by predetermined software on the information processing terminal. Alternatively, the information selecting and displaying method may further include a content obtaining step of obtaining content via a network.

In the content selecting step, at least part of the content obtained via the network may be selected, and, in the content extracting step, the selected part of the content may be extracted into the semiconductor memory.

In the content obtaining step, content may be obtained at a specified time, from a specified uniform resource locator (URL), both of which are specified by the information processing terminal.

The content may be particularly text content.

According to the present invention, a user may store necessary information on a semiconductor memory and easily carry the semiconductor memory placed in an information display device. Accordingly, the user may easily view the information. By changing the direction of content being displayed on a display unit in accordance with the angle of rotation of a planar display unit relative to a planar main unit, the information display device becomes more convenient and user-friendlier.

BRIEF DESCRIPTION OF THE DRAWINGS

FIGS. 4A and 4B are external views of a semiconductor memory for use in the specific example;

FIG. 5 is a block diagram of the internal structure of the semiconductor memory placed in the information display device.

DESCRIPTION OF THE PREFERRED EMBODIMENTS

The present invention is an information display device that can efficiently carry the minimum information required and that enables quick viewing of information. Compared with high-performance stationary PCs, known portable information processing terminals such as PDAs and mobile PCs are mainly used to manage schedules and email exchanges of individuals. Such purposes are very narrow in view of functions available for the stationary PCs. An information display device 1, which will be described in a specific example, is a device having an improved "information viewing function", which is the minimum function required by an information processing terminal. By limiting the amount of information that can be displayed, reading the minimum information required from a memory, and displaying the information, the information display device 1 becomes more portable, user-friendlier, and more convenient. The information display device 1 need only be provided with a function of receiving information data from a semiconductor memory and displaying the information data.

With reference to the drawings, the specific example of the present invention will now be described in detail.

Figure 1:
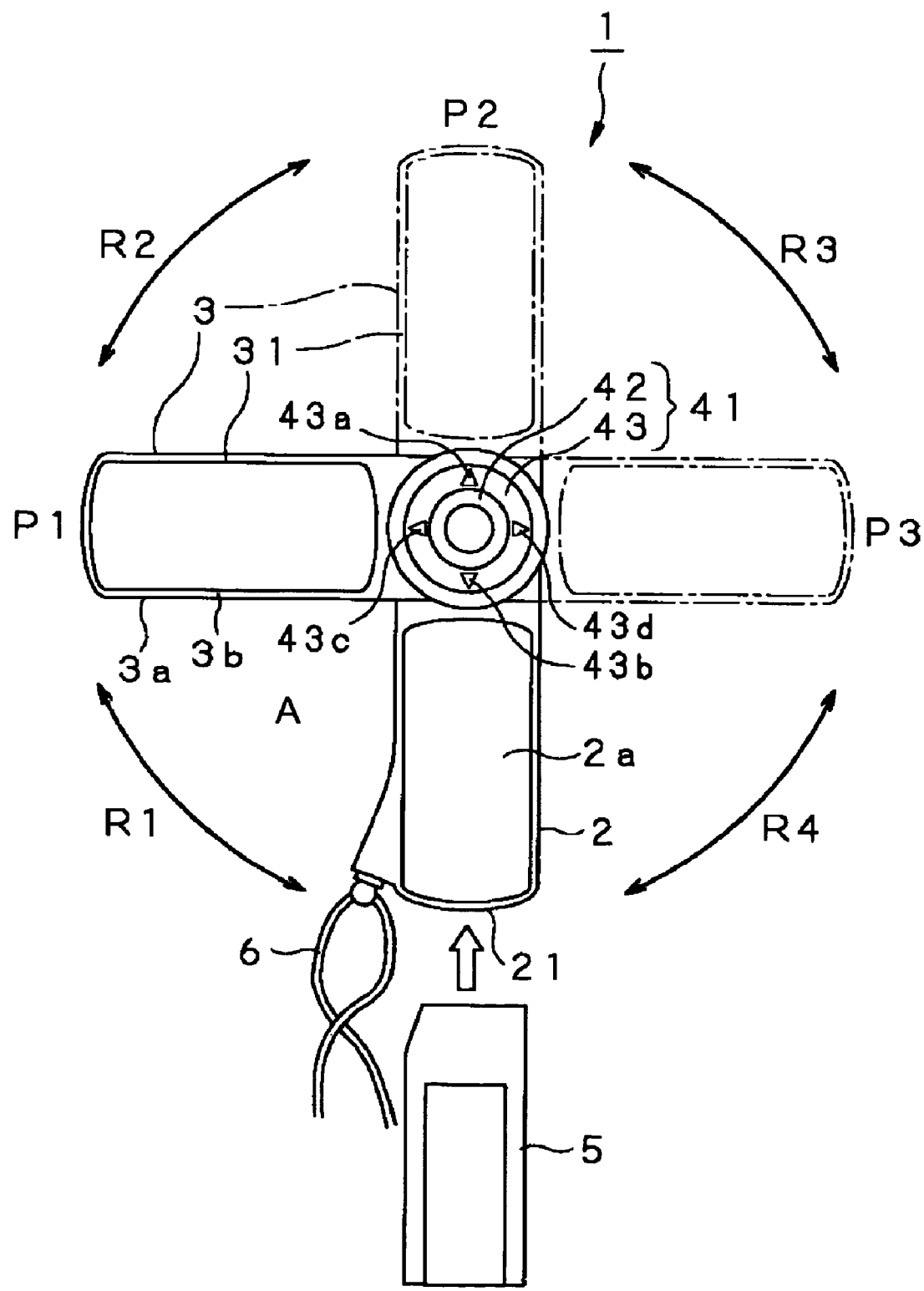
FIG. 1 is a front view of the appearance of an information display device serving as a specific example of the present invention.

Referring to FIG. 1, the information display device 1, which serves as the specific example of the present invention, includes a main unit 2 that houses a removable semiconductor memory 5 and a display unit 3 that has substantially the same shape as that of the main unit 2 and that displays information read from the semiconductor memory 5. The main unit 2 and the display unit 3 are interconnected by a connecting portion with a rotating shaft around which the display unit 3 turns relative to the main unit 2 on opposing plane A between a main-unit top face 2a and a display-unit principal face 3a, which oppose each other.

In this specific example, the semiconductor memory 5 is a rectangular sheet having the appearance shown in FIGS. 4A and 4B. The details of the semiconductor memory 5 will be described later. The main unit 2 has a semiconductor memory insertion slot 21 into which the semiconductor memory 5 can be inserted. The semiconductor memory insertion slot 21 is disposed at one end of the main unit 2, which differs from that at which the connecting portion is disposed.

The semiconductor memory insertion slot 21 is a recess disposed at one end of the main unit 2, which differs from that at which the connecting portion is disposed. This recess has substantially the same dimensions as the length, width, and thickness of the semiconductor memory 5. A connection terminal for making a connection with a semiconductor memory is disposed on the base of the recess. Upon insertion of the semiconductor memory 5 into the semiconductor memory insertion slot 21, the semiconductor memory insertion slot 21 is electrically connected with the semiconductor memory 5. The external shape of the main unit 2 has, as shown in FIG. 1, dimensions slightly larger than those of the semiconductor memory 5.

The display unit 3 has substantially the same shape as that of the main unit 2. The display unit 3 has substantially the same dimensions as the length and width of the main unit 2. A back face (3b) of the display-unit principal face 3a opposing the main-unit top face 2a has a display screen 31. From this point onward, the face 3b having the display screen 31 and the main-unit top face 2a serve as front faces (or faces in use). In view of low-power consumption, compact size, and light weight, the display screen 31 of the display unit 3 is a black-and-white liquid crystal display (LCD) panel capable of displaying four to five lines of text data.

An operation input unit 41 for operating the information display device 1 is disposed on the connecting portion interconnecting the main unit 2 and the display unit 3. The operation input unit 41 is circular in accordance with the rotating shaft shown in FIG. 1. At the center of the operation input unit 41, a pressing button 42 that detects pressing of the pressing button 42 is disposed. A direction button 43 including a top portion 43a, a bottom portion 43b, a left portion 43c, and a right portion 43d, all of which detect pressing of the direction button 43 in cruciform formation, surrounds the pressing button 42.

Referring to FIG. 1, the arrows R1, R2, R3, and R4 represent rotation of the display unit 3 relative to the main unit 2 of the information display device 1. A reference state (or an unused state) of the display unit 3 is the display unit 3 being laid on top of the main unit 2. The display unit 3 is rotatable in the directions represented by the arrows R1 and R4. In the reference state, the information display device 1 has a so-called "media-size" of the semiconductor memory 5. The information display device 1 having this structure can be held and used in one hand by sliding the main unit 2 and the display unit 3 away from each other in a fan-fold manner. As shown in FIG. 1, the information display device 1 may have a strap 6, thereby becoming more portable and convenient.

Figure 2:
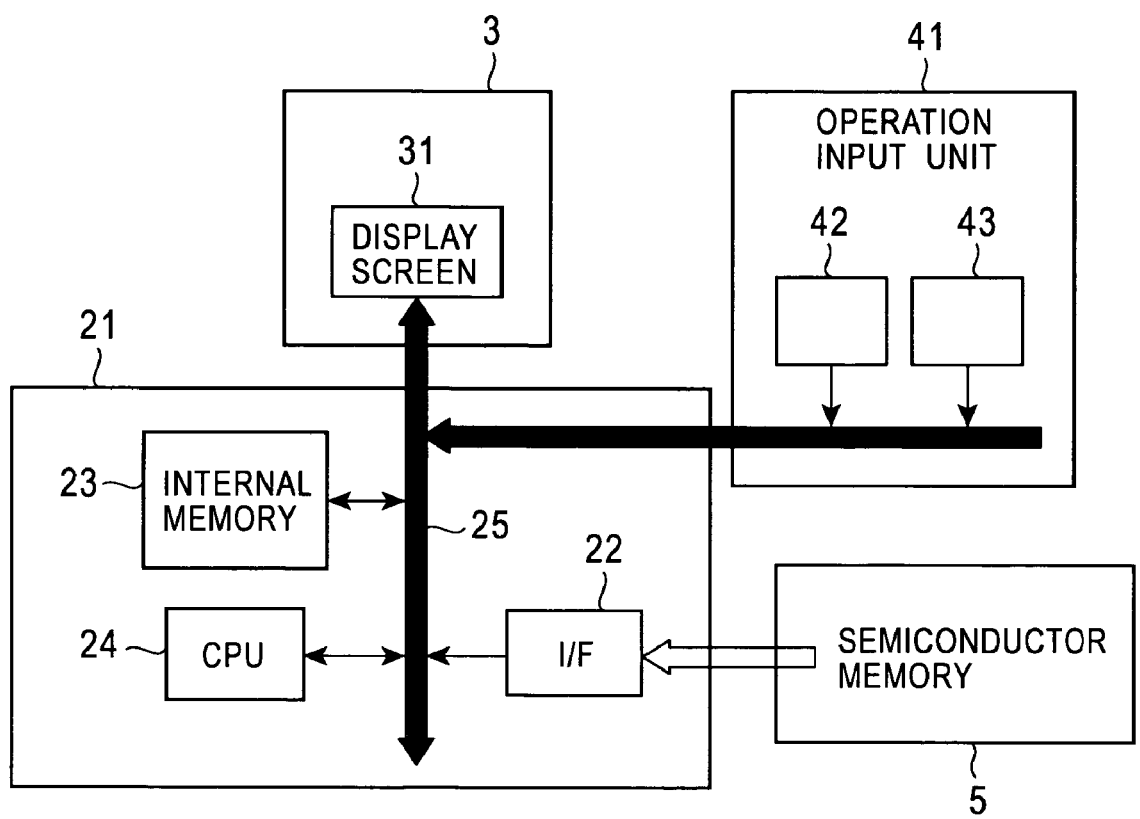
FIG. 2 is a block diagram of the internal structure of the information display device.

Referring to FIG. 2, the internal structure of the information display device 1 will now be described.

The main unit 2 of the information display device 1 includes an interface 22 that receives content data from the semiconductor memory 5 serving as an external storage unit placed in the semiconductor memory insertion slot 21, an internal memory 23 that temporarily stores the received data, and a central processing unit (CPU) 24 that controls the operation of the information display device 1. These components are interconnected by an internal bus 25. The information display device 1 is provided with the operation input unit 41 including the pressing button 42 and the direction button 43 for receiving instructions from a user. The operation input unit 41 and the main unit 2 are also connected to the internal bus 25.

The internal memory 23 is a temporary storage area for temporarily storing data received from the semiconductor memory 5 via the interface 22 and is used as a work area for the CPU 24.

The CPU 24 selects and reads content data from the semiconductor memory 5 in response to an instruction given from a user using the operation input unit 41, displays the read content data on the display screen 31, and changes the display format of the content data displayed on the display screen 31.

For example, the display format of the content may be changed by the CPU 24 to display the content on the display screen 31 in a longitudinal or transverse format in accordance with the angle of rotation of the display unit 3 relative to the main unit 2.

More specifically, when the display unit 3 is moved relative to the main unit 2 from the reference state shown in FIG. 1 in the direction represented by the arrow R1 by 90° and is at the position P1, the content is displayed in the transverse format in which the "row" is the long side of the display screen 31. When the display unit 3 is further moved from the position P1 in the direction represented by the arrow R2 by 90° and is at the position P2, the content is displayed in the longitudinal format in which the "row" is the long side of the display screen 31. When the display unit 3 is at the position P3, as in the position P1, the content is displayed in the transverse format in which the "row" is the long side of the display screen 31.

Upon rotation of the display unit 3, the direction of the content being displayed is rotated by the same angle as the angle of rotation of the display unit 3 in a direction opposite to the rotation of the display unit 3. For example, when the display unit 3 is rotated clockwise by 45°, the content displayed on the display unit 3 is rotated 45° in counter-clockwise direction. As a result, the direction of display relative to the user remains unchanged even when the display unit 3 is rotated.

In accordance with differences in the display format, the CPU 24 changes the selection allocation of the direction button 43. Specifically, when the display unit 3 is rotated relative to the main unit 2 from the reference position shown in FIG. 1 in the direction represented by the arrow R1 and is at the position P1, pressing of the bottom portion 43b of the direction button 43 of the operation input unit 41 moves a cursor or scrolls the displayed content in the short-side direction of the display screen 31 (longitudinal direction in this display state). Pressing of the right portion 43d of the direction button 43 moves the cursor or scrolls the displayed content in the long-side direction of the display screen 31 (transverse direction in this display state).

When the display unit 3 is further rotated relative to the main unit 2 from the position P1 shown in FIG. 1 in the direction represented by the arrow R2 and is at the position P2, pressing the bottom portion 43b of the direction button 43 of the operation input unit 41 moves the cursor or scrolls the displayed content in the long-side direction of the display screen 31 (longitudinal direction in this display state). When the display unit 3 is in the same state relative to the main unit 2, pressing the right portion 43d of the direction button 43 moves the cursor or scrolls the displayed content in the short-side direction of the display screen 31 (rightward direction in this state).

As described above, the display screen 31 of the display unit 3 is controlled by the CPU 24, and content data (information) such as text data or image data read from the semiconductor memory 5 is subjected to display processing by a display processing circuit (not shown) and is displayed.

According to the above-described information display device 1, the user may store necessary information on the semiconductor memory 5 and easily carry the information by placing the semiconductor memory 5 in the information display device 1. This provides easy viewing of the information. Compared with known PDAs, the display screen 31 of the information display device 1 displays a limited amount of information and has the above-described external structure. Therefore, content to be displayed can be selected by one push of the button. The information stored on the semiconductor memory 5 can be viewed with simple operation.

Content that can be displayed by the information display device 1 is part of content obtained by or information managed by an information processing terminal, such as a PC, to which the semiconductor memory 5 is connectable, the part being selected and extracted by the information processing terminal.

One method of efficiently viewing content by the information display device 1 is to execute, by utility software activated on a PC into which the semiconductor memory 5 can be inserted, a process of selecting and extracting content and storing the content on the semiconductor memory 5.

Figure 3:
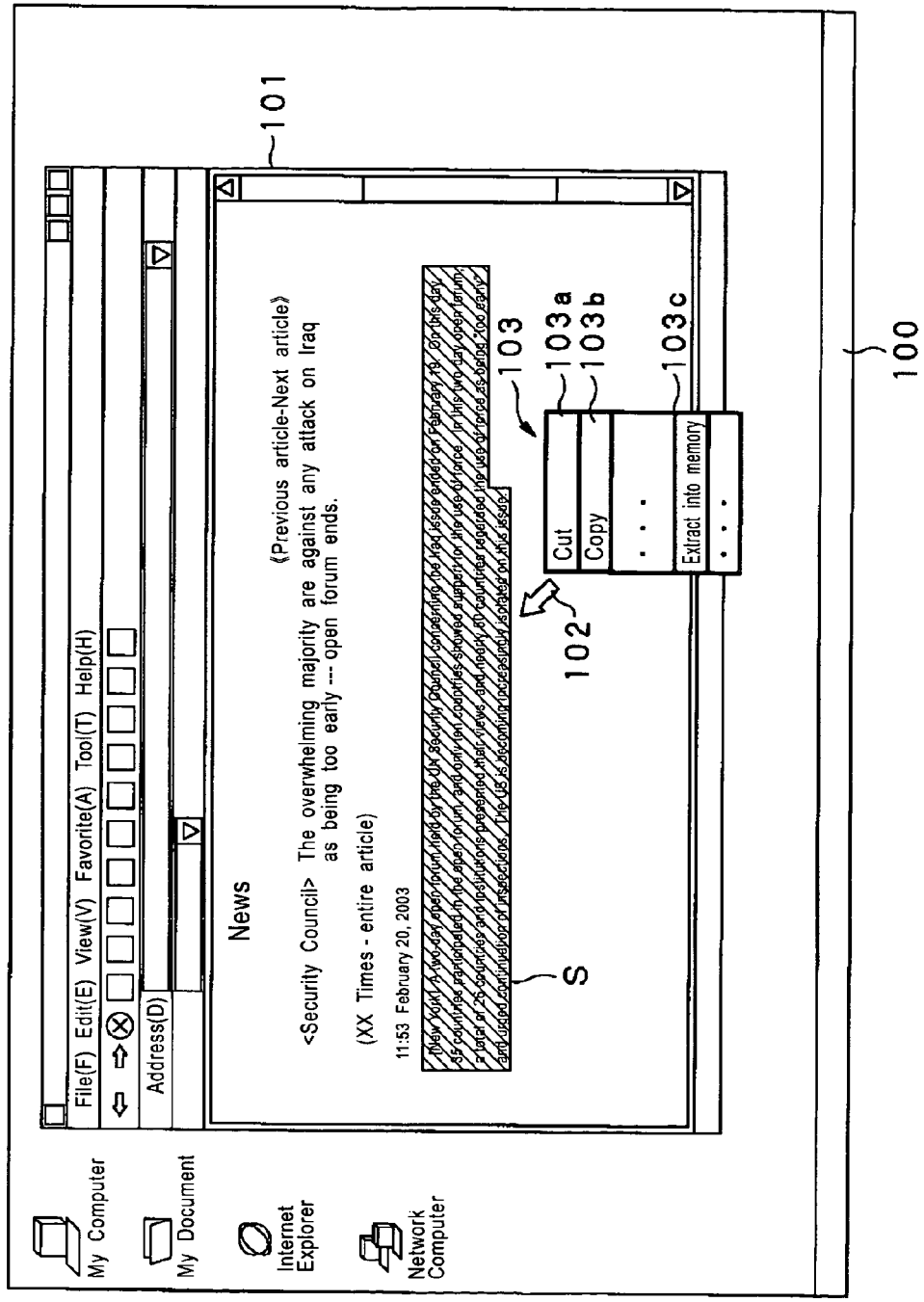
FIG. 3 is a schematic diagram illustrating how content to be viewed on the information display device is extracted from a web site displayed on a monitor of a PC.

Referring to FIG. 3, the process, which is performed by a PC, of selecting and extracting content and storing the content on the semiconductor memory 5 will now be described. This process can be executed by utility software activated on the PC. For example, a clip folder is located on a desktop. A program of extracting content into the semiconductor memory 5 serving as utility software is activated at all times. In the following description, the operating system of the PC is Windows®.

FIG. 3 shows a website window 101 displayed on a monitor 100 of the PC. A mouse pointer 102 on the monitor 100 is moved by a user. Mouse operation specifies area S as a selected area, and mouse clicking displays a tool button bar 103.

Upon selection of "Extract into memory (button 103c)" from among graphical user interface (GUI) buttons such as "Cut (button 103a)" and "Copy (button 103b)" displayed in the tool button bar 103, text data in the area S on the window 101 is extracted into the semiconductor memory 5. In many cases, extracted content is text content. However, when the selected area contains image data such as a map file or photograph in joint photographic coding export group (JPEG) format, the image data is converted into a binary image and is extracted into the semiconductor memory 5.

Content to be extracted may be selected by, as described above, the user by operating the mouse on the PC, or may be automatically extracted by various software settings. For example, a main or beginning portion of text content may be selected and extracted from a website of interest using a font-filter utility.

Content may be extracted at a specified time from a specified URL, both of which are specified by the PC. By this function and font filter together, text content satisfying a specified condition is extracted at a specified time, from a specified URL.

In addition to content selected on a web page, information may be selected from email and schedule information managed by the PC. For example, in operative association with mailer software and schedule management software activated on the PC, text data from unopened email of received email may be extracted into the semiconductor memory 5, or address information of individuals under management may be extracted. When a new event is added by the schedule management software, this information may be extracted.

In addition to extracting, by the PC, content to be stored on the semiconductor memory 5, dedicated content for viewing by the information display device 1 may be provided in advance by a website. Clicking an icon on the website by the PC causes the dedicated content to be downloaded into the semiconductor memory 5 in a format that can be viewed by the information display device 1. The dedicated content includes, for example, learning content that can be used as a vocabulary workbook in which English words and Japanese translations are displayed alternately by each operation by the information display device 1, a novel, or a news article.

By selecting and extracting content and storing the content on the semiconductor memory 5 in this manner, the content displayed on the information display device 1 may be prepared in advance, thereby enabling efficient viewing of the content by the information display device 1.

For example, the memory having the appearance shown in FIGS. 4A and 4B is applicable as the semiconductor memory 5 for use in this specific example. This semiconductor memory 5 has a casing 201 with, for example, a length of 50 mm, a width of 21.5 mm, and a thickness of 2.8 mm. The semiconductor memory 5 further includes a 10-pin terminal 202 for inputting/outputting a bus state indicating the state of a serial bus when being placed in an external electronic apparatus, various data, clock, etc. The semiconductor memory 5 further includes a mis-deletion prevention switch 203 for preventing mis-deletion of data stored on the semiconductor memory 5.

Referring to FIG. 5, for example, the semiconductor memory 5 has a flash memory 204 that has a storage capacity of several mega bytes to dozens of mega bytes for storing various types of data imported from an electronic apparatus in which the semiconductor memory 5 is placed, a memory controller 205 that manages the contents of the flash memory 204, and an interface 206 that is connectable to the electronic apparatus and that inputs/outputs various types of data.

Using only a 3-pin terminal (for data, clock, and bus state) of the 10-pin terminal 202, the semiconductor memory 5 described as above transfers the data, clock, and bus state with the electronic apparatus. The clock and bus state are supplied from the electronic apparatus, whereas the data is transferred between the semiconductor memory 5 and the electronic apparatus by bidirectional half duplex transmission. To transfer a control packet serving as the data with the electronic apparatus, the semiconductor memory 5 adds, for example, an error check code in units of 512 bytes at a maximum clock frequency of 20 MHz and transfers the data.

Under the control of the memory controller 205, the semiconductor memory 5 performs processing in compliance with a serial interface protocol and controls the flash memory 204.

Specifically, for example, when the flash memory 204 consists of a plurality of flash memories, the semiconductor memory 5 under the control of the memory controller 205 controls each of the flash memories. When the flash memory 204 consists of a plurality of flash memories of different types, the semiconductor memory 5 under the control of the memory controller 205 absorbs differences in characteristics of these various types of flash memories, controls each of the flash memories, and performs error correction in accordance with error characteristics of the various types of flash memories. Under the control of the memory controller 205, the semiconductor memory 5 converts parallel data into serial data.

Under the control of the memory controller 205, the semiconductor memory 5 performs processing in compliance with the serial interface protocol. Accordingly, the semiconductor memory 5 may control any type of flash memory that exist now or may exist in the future.

To manage files on the flash memory 204, the semiconductor memory 5 uses, for example, a hierarchical file system based on a file allocation table (FAT), which is normally maintained on a PC. On the basis of the hierarchical file system based on the FAT, the semiconductor memory 5 stores data in plural formats such as, for example, still image data, moving image data, audio data (music data), voice data, and the like on the flash memory 204 and, under the memory controller 205, controls the contents of the flash memory 204. In each format of the data, the semiconductor memory 5 defines in advance a file format and directory management when recording data on the flash memory 204. In accordance with the defined rule, the semiconductor memory 5 manages data recorded on the flash memory 204.

Figure 6:
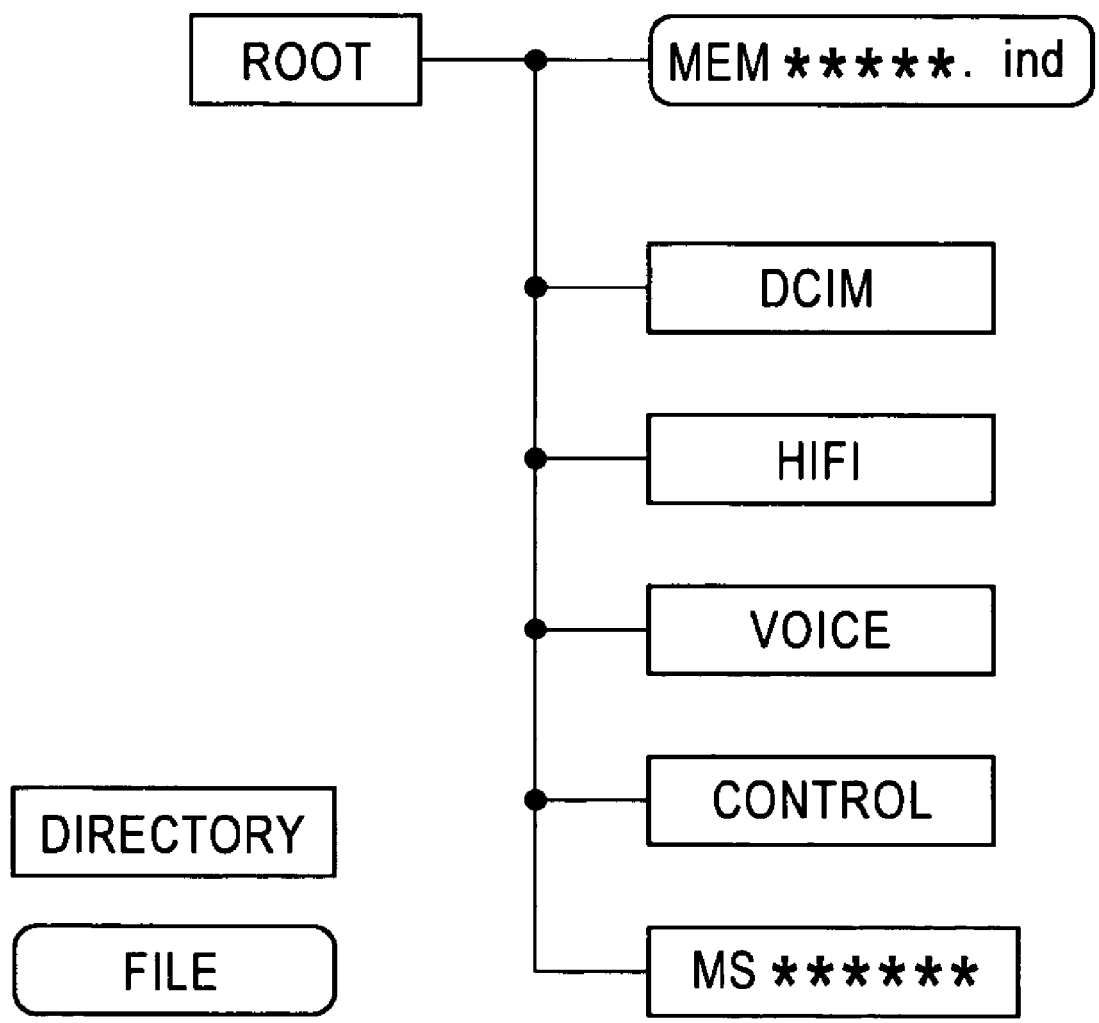
FIG. 6 is a diagram of the directory structure of the semiconductor memory.

Specifically, referring to FIG. 6, a root directory of the flash memory 204 includes "MEM***.ind" which is a file indicating the type of the semiconductor memory 5, "DCIM" which is a directory storing still image files, "HIFI" which is a directory storing audio files, "VOICE" which is a directory storing voice files, "CONTROL" which is a directory storing additional information files such as control information files, and "MS****" which is a directory storing information unique to each vender.

The semiconductor memory 5 adopts, as the format of still image data, a design rule for camera file system (DCF) standardized by the Japan Electronic Industry Development Association (JEIDA) and, as the format of audio data, adaptive differential pulse code modulation (ADPCM) of the ITU-T (ITU Telecommunication Standardization Sector) Recommendations G.726.

Using the semiconductor memory 5 described above as an external storage unit, the user using this single semiconductor memory 5 need not use a connection interface common to a plurality of electronic apparatuses handling data in different formats.

The present invention is not limited to the foregoing specific example, and various changes can be made without departing from the scope of the present invention.

For example, the information display device 1 may have the display screen 31 disposed on the display-unit principal face 3a opposing the main-unit top face 2a. Accordingly, the display screen 31 may be protected when the main unit 2 and the display unit 3 are top on each other (unused state). The information display device 1 may be provided with a light emitting diode (LED) indicating power ON/OFF, battery strength, etc. and an alarm indicating the operation state or giving an error warning.

What is claimed is:

1. An information display device comprising:
a planar main unit including a semiconductor memory insertion slot in which a thin planar semiconductor memory is removably stored;
a planar display unit having substantially the same shape as the planar main unit, the planar display unit including a display for displaying content stored on the semiconductor memory;
an operation unit for entering an operation instruction to change the display state of the content on the display; and
a controller configured to change the display state of the content on the display in accordance with the operation instruction entered using the operation unit,
wherein the planar main unit and the planar display unit are interconnected by a connecting portion having a rotating shaft,
wherein the display and a planar main unit top face are parallel to each other in a closed position, and
wherein the planar display unit and the planar main unit are configured to rotate from the closed position to an open position around the rotating shaft and relative to each other such that the display and the planar main unit top face rotate in parallel planes, wherein the controller rotates a content direction of the content being displayed by an angle equal to an angle of rotation of the planar display unit relative to the planar main unit.

2. An information display device according to claim 1, wherein the operation unit is disposed on the connecting portion.

3. An information display device according to claim 1, wherein the content includes information managed by predetermined software on an information processing terminal to which the semiconductor memory is connectable.

4. An information display device according to claim 1, wherein the content is content that is obtained via a network by an information processing terminal to which the semiconductor memory is connectable, selected by the information processing terminal, and stored on the semiconductor memory.

5. An information display device according to claim 4, wherein the content is content that is obtained at a specified time, from a specified uniform resource locator (URL), both of which are specified by the information processing terminal.

6. An information display device according to claim 1, wherein the content is text content.

7. An information selecting and displaying method for selecting information by an information processing terminal to which a semiconductor memory is connectable, extracting the information, and displaying the information by an information display device, comprising:
selecting at least part of a content by the information processing terminal;
extracting the selected content in a format that can be viewed on the information display device; and
displaying, by the information display device, the content extracted into the semiconductor memory in the extracting,
wherein the displaying includes displaying the information on a display of a planar display unit that is interconnected to a planar main unit by a connecting portion having a rotating shaft, the display and a planar main unit top face are parallel to each other in a closed position, and the planar display unit and the planar main unit are configured to rotate from the closed position to an open position around the rotating shaft and relative to each other such that the display and the planar main unit top face rotate in parallel planes, and wherein the displaying includes rotating a content direction of the content being displayed by an angle equal to an angle of rotation of the planar display unit relative to the planar main unit.

8. An information selecting and displaying method according to claim 7, wherein the selected content includes information managed by predetermined software on the information processing terminal.

9. An information selecting and displaying method according to claim 7, further comprising obtaining content via a network,
wherein the selecting includes selecting at least part of the content obtained via the network, and the extracting includes extracting the selected part of the content into the semiconductor memory.

10. An information selecting and displaying method according to claim 9, wherein the obtaining includes obtaining content at a specified time, from a specified unified resource locator (URL), both of which are specified by the information processing terminal.

11. An information selecting and displaying method according to 7, wherein the content is text content.

12. An information display device comprising:
a planar main unit including a semiconductor memory insertion slot in which a thin planar semiconductor memory is removably stored;
a planar display unit having substantially the same shape as the planar main unit, the planar display unit including a display configured to display content stored on the semiconductor memory;
an operation unit for entering an operation instruction to change the display state of the content on the display; and
a controller configured to change the display state of the content on the display in accordance with the operation instruction entered using the operation unit,
wherein the planar main unit and the planar display unit are interconnected by a connecting portion having a rotating shaft, and a display format of the content is changed in accordance with an angle of rotation of the display unit relative to the main unit, and wherein a content direction of the content being displayed is rotated by an angle equal to the angle of rotation of the display unit.

13. An information display device according to claim 12, wherein the content direction of the content being displayed is rotated in a content rotation direction opposite to the rotation of a rotation direction of the display unit.

14. An information display device comprising:
a planar main unit including a semiconductor memory insertion slot in which a thin planar semiconductor memory is removably stored;
a planar display unit having substantially the same shape as the planar main unit, the planar display unit including a display configured to display content stored on the semiconductor memory;
an operation unit for entering an operation instruction to change the display state of the content on the display; and a controller configured to change the display state of the content on the display in accordance with the operation instruction entered using the operation unit, wherein the planar main unit and the planar display unit are interconnected by a connecting portion having a rotating shaft, and the operation unit is centered on the rotating shaft.

15. An information display device according to claim 14, wherein the operating unit includes a pressing button at the center of the operation input unit.

16. An information display device according to claim 15, wherein the operating unit includes a direction button surrounding the pressing button.

17. An information display device according to claim 16, wherein the direction button includes a top portion, a bottom portion, a left portion and a right portion, each configured to detect pressing of the direction button in cruciform formation.

* * * * *

UNITED STATES PATENT AND TRADEMARK OFFICE
CERTIFICATE OF CORRECTION

| | |
|---|---|
| PATENT NO. | : 7,339,576 B2 |
| APPLICATION NO. | : 10/800105 |
| DATED | : March 4, 2008 |
| INVENTOR(S) | : Takeshi Kuroiwa |

Page 1 of 1

It is certified that error appears in the above-identified patent and that said Letters Patent is hereby corrected as shown below:

Column 10, line 23, change "unified" to --uniform--.

Signed and Sealed this

Sixteenth Day of September, 2008

JON W. DUDAS
*Director of the United States Patent and Trademark Office*